(12) United States Patent
Nishihara et al.

(10) Patent No.: US 6,244,105 B1
(45) Date of Patent: Jun. 12, 2001

(54) TIRE UNIFORMITY MACHINE

(75) Inventors: Toshiharu Nishihara; Naoyuki Miyazono, both of Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/459,047

(22) Filed: Dec. 10, 1999

Related U.S. Application Data

(62) Division of application No. 08/920,813, filed on Aug. 29, 1997.

(30) Foreign Application Priority Data

Sep. 2, 1996 (JP) .................................................. 8-231765

(51) Int. Cl.$^7$ ................................................ G01M 17/02
(52) U.S. Cl. .................................... 73/146; 73/8; 157/16; 157/17; 157/18; 157/21
(58) Field of Search .................................. 73/146, 146.2, 73/8; 157/14, 15, 16, 17, 18, 19, 20, 21

(56) References Cited

U.S. PATENT DOCUMENTS

| | | | | |
|---|---|---|---|---|
| 4,574,628 | * | 3/1986 | Maikuma et al. | 73/146 |
| 4,916,943 | * | 4/1990 | Himmler et al. | 73/146 |
| 4,964,299 | * | 10/1990 | Maier et al. | 73/146 |
| 4,971,128 | * | 11/1990 | Koga et al. | 73/146 |
| 5,033,003 | * | 7/1991 | Lees, Sr. | 73/146 |
| 5,052,218 | * | 10/1991 | Iwama | 73/146 |
| 5,099,684 | * | 3/1992 | Okamoto | 73/146 |
| 5,107,703 | * | 4/1992 | Ota | 73/146 |
| 5,219,387 | * | 6/1993 | Okamoto | 73/146 |
| 5,257,561 | * | 11/1993 | Folta | 73/146 |
| 5,259,242 | * | 11/1993 | Folta | 73/146 |
| 5,562,358 | * | 10/1996 | Okamoto et al. | 73/146 |
| 5,719,331 | * | 2/1998 | Delmoro | 73/146 |

\* cited by examiner

*Primary Examiner*—Eric S. McCall
(74) *Attorney, Agent, or Firm*—Anderson, KIll & Olick P.C.

(57) ABSTRACT

In a tire uniformity machine in which a tire is mounted between upper and lower spindles via upper and lower rims, a rim holding apparatus 10 is composed of a parallel spindle 1 which is in parallel with the axis of tire uniformity machine, a taper collet 2 formed with an inner hole engaging concentrically with the parallel spindle 1 at the center portion thereof and a taper surface at the outer peripheral portion thereof, a rim formed with a taper surface engaging with the taper surface of the taper collet 2 at the inner peripheral portion thereof, a rim clamping device 4 which holds the rim 3 and is mounted so that the parallel spindle 1 is capable of being moved in the axial direction, and a fixing device 5 for determining the axial position of the rim clamping device 4. Thereby, there is provided a highly accurate tire uniformity machine in which (1) the change of rim width and the fitting/removal of rim can be performed easily, and (2) the runout of rim can be decreased to 0.025 mm (standard) or less.

3 Claims, 13 Drawing Sheets

F I G. 5
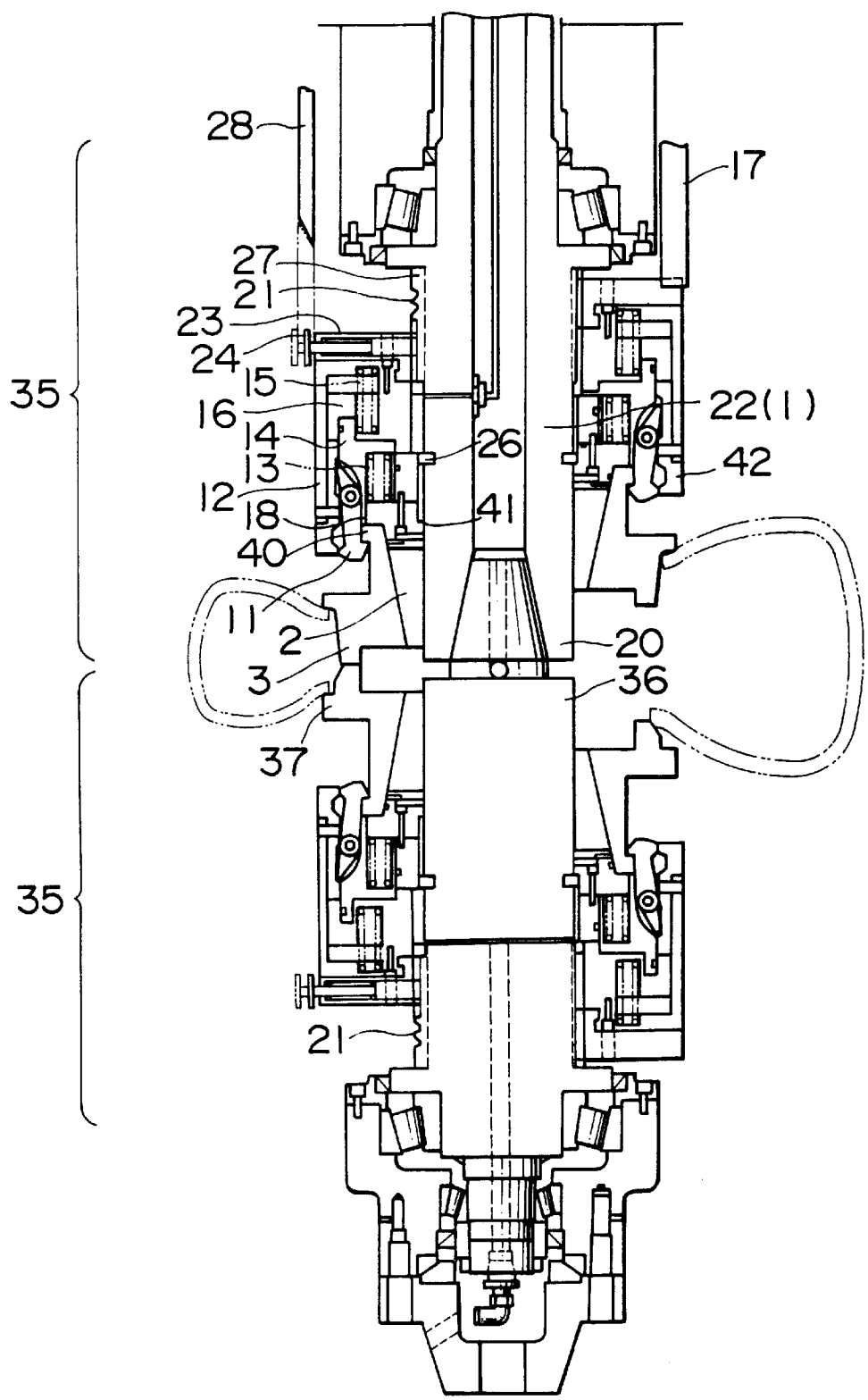

FIG. II
RELATED ART

TIRE UNIFORMITY MACHINE

This application is being filed as a divisional application of U.S. patent application Ser. No. 08/920,813 filed Aug. 29, 1997.

BACKGROUND OF THE INVENTION

1. Field of the Invention

The present invention relates to a rim holding apparatus and a rim width changing apparatus between upper and lower rims, which are applied to a tire uniformity machine.

2. Description of the Related Art

A tire uniformity machine is designed so that a tire is mounted on upper and lower spindles via upper and lower rims, and the uniformity etc. of the tire is measured by pressing a load wheel against the tire while rotating the tire around the axes of spindles. The parts of this tire uniformity machine have so far been configured as described below.
(1) FIG. 10 shows the relationship between a spindle external fitting portion and a rim inside. The spindle external fitting portions (upper and lower locking means 115 and 116) are arranged in parallel with the insides of rims 113 and 114 (for example, see Japanese Patent Provisional Publication No. 5-66171 (No. 66171/1993)).
(2) FIG. 11 shows a rim drop preventive mechanism. The configuration is such that the drop of a rim 113 is prevented by using a n external hook-type drop preventive mechanism 144 to 146 attached to an external fixing side 109 of a spindle 101 (for example, see Japanese Patent Provisional Publication No. 5-66171 (No. 66171/1993)).
(3) FIG. 12 shows a rim width changing apparatus between upper and lower rims. The configuration is such that the rim width is changed by using an external loader unit 247 to 265 and rims 213 and 214 (for example, see Japanese Patent Provisional Publication No. 3-257340 (No. 257340/1991)).
(4) FIG. 13 shows another rim width changing apparatus between upper and lower rims. The configuration is such that only an upper rim 316 is moved vertically while being rotated with respect to an upper spindle 301, and an offset between a centerline CL (centerline in the width direction) between upper and lower rims 316 and 333 and a centerline CW (centerline in the width direction) of a load wheel LW is corrected by vertically moving a bearing housing 303 (upper and lower spindles 301 and 308) in the same direction (for example, see Japanese Patent Provisional Publication No. 3-188348 (No. 188348/1991)).

With the tire uniformity machine shown in FIGS. 10 to 12, a rim clamping device for parallel rims, which is of a hydraulic type, locks/unlocks parallel rims 113 and 114 and parallel spindles 101 and 102 by moving expanding/contracting rings 119 and 120 in relation to a piston. For this reason, during unlocking, the gap between the rim and spindle is very small (about 0.1 mm), being about 0.5 mm even in the case of expansion/contraction of a collet, for example, described in Japanese Patent Provisional Publication No. 7-190898 (No. 190898/1995). In this state, the rim is fitted onto and removed from the spindle. Therefore, when the rim is fitted or removed, positioning with accurate concentricity between the rim and spindle is needed, and also a liftable rim conveying device is needed.

On the tire uniformity machine shown in FIG. 11, hydraulic expanding/contracting rings 119 and 120 are used for a parallel rim holding mechanism. The expanding/contracting ring has a thickness as less as about 1 mm, so that wear and fatigue occur easily, resulting in low durability of the ring. Also, since the contact surface of the expanding/contracting ring in expansion constitutes a part of the structure, there is a risk of poor concentricity. Moreover, since the hydraulic expanding/contracting ring is held by a liquid pressure, there is a risk of poor concentricity of rim when a load is applied in the radial direction.

Also, on the above-mentioned tire uniformity machine, since the rim clamping device for parallel rims, which is of a hydraulic type, locks/unlocks the parallel rim 113 and parallel spindle 101 by moving the expanding/contracting ring in relation to the piston, there is a possibility for the parallel rim to drop when the hydraulic pressure is relieved. Therefore, the external rim drop preventive mechanism 144 to 146 is indispensable.

Also, on the above-mentioned tire uniformity machine, the fabrication of a rim fitting/removing portion wedge and the flow passage inside the ring and spindle is complicated.

Also, on the above-mentioned tire uniformity machine, the long spindle is divided into two pieces in consideration of the complicated fabrication and maintainability. When the spindle is assembled, therefore, highly accurate alignment of spindle is needed in order to ensure high rim runout accuracy.

On the tire uniformity machine shown in FIG. 12, when the upper and lower rim widths are changed, complicated loader movement such that the upper rim 213 is first set by an external loader and then the lower rim 214 is set is indispensable, so that much time i required for the rim width change due to the external loader unit 247 to 265.

Also, on the tire uniformity machine shown in FIG. 13, since only the upper rim is moved by an adapter 317 and spindle screw 307, the centerlines of the load wheel and tire shift from each other, which has some influence on the measurement results. Therefore, a moving mechanism must be added to the spindle itself to eliminate this shift (offset).

Also, on the above-mentioned tire uniformity machine, since only the upper rim is moved by an adapter 317 and spindle screw 307, the adapter 317 and the spindle 301 move in the axial direction while being rotated relatively. On the other hand, an O-ring etc. must be interposed between the adapter and spindle to seal the internal pressure of rim. However, when the adapter moves in the axial direction, because of the relative rotation of the adapter and spindle, the seal is rubbed each time the rim width is changed, so that early breakage or air leakage occurs.

SUMMARY OF THE INVENTION

The present invention was made in view of the above problems, and accordingly an object thereof is to provide a highly accurate tire uniformity machine in which (1) the change of rim width and the fitting/removal of rim can be performed easily, and (2) the runout of rim can be decreased to 0.025 mm (standard) or less.

To achieve the above object, the present invention provides a tire uniformity machine in which a tire is mounted between upper and lower spindles via upper and lower rims, the tire uniformity machine being characterized in that a rim holding apparatus 10 is composed of a parallel spindle 1 which is in parallel with the axis of tire uniformity machine, a taper collet 2 formed with an inner hole 2a engaging concentrically with the parallel spindle 1 at the center portion thereof and a taper surface 2b at the outer peripheral portion thereof, a rim formed with a taper surface 3a engaging with the taper surface of the taper collet 2 at the inner peripheral portion thereof, a rim clamping device 4 which holds the rim 3 and is mounted so that the parallel spindle 1 is capable of being moved in the axial direction, and a fixing device 5 for determining the axial position of the rim clamping device 4 (see FIG. 1).

In the tire uniformity machine shown in FIG. 1, the rim clamping device 4 may be composed of a hook 11 for holding/releasing the rim 3 by being opened/closed in the radial direction, a cylinder 12 for opening/closing the hook 11 by moving in the axial direction, a piston 14 which supports the hook 11 in such a manner as to be movable vertically and pushes the rim 3 by means of a pushing portion 18, a spring 13 for urging the piston 14 in the ascending direction, a spring 15 for urging the cylinder 12 in the ascending direction, a clamp body 16 which holds the rim 3, supports the piston 14 in such a manner as to be movable vertically, and is mounted so that a parallel spindle 1 is capable of being moved in the axial direction, and a pushing device 17 for pushing the cylinder 12 from the outside in the descending direction (see FIG. 2).

The present invention provides a tire uniformity machine in which a tire is mounted between upper and lower spindles via upper and lower rims, the tire uniformity machine being characterized in that a rim width changing apparatus 35 between upper and lower rims is composed of threads 21 provided on an upper spindle 20 having a driving unit, a parallel spindle portion 22 provided on the upper spindle 20 below the threads 21, a moving device 23 mounted so as to enable the rotation and axial movement of the upper spindle 20 via the threads 21 of the upper spindle 20, a detent pin 24 for inhibiting the relative rotation between the upper spindle 20 and the moving device 23, a rim clamping device 25 which engages with the parallel spindle portion 22 of the upper spindle 20 and is rotatably connected to the moving device 23, a rim 3, a detent key 26 for inhibiting the relative rotation between the rim clamping device 25 and the spindle 20, a groove 27 for supporting the detent pin 24 of the moving device 23 in such a manner as to be movable along the upper spindle 20, and an arm 28 for pulling out the detent pin 24 of the moving device 23 (see FIG. 3).

In the tire uniformity machine shown in FIG. 3, the tire uniformity machine may be configured so that the rim width changing apparatuses 35 between upper and lower rims are installed symmetrically to the upper and lower spindles 20 and 36, threads 21 on the upper spindle 20 and threads 21 on the lower spindle 36 are formed in the direction opposite to each other, and the upper and lower spindles 20 and 36 are rotated at the same time while being chucked, by which the vertical rim widths are changed by the same amount, so that the rim width between upper and lower rims is changed while the centerline C—C between the upper and lower rims 3 and 37 is kept constant (see FIG. 4).

In the tire uniformity machine shown in FIG. 4, the tire uniformity machine may be configured so that the threads 21 formed on the upper and lower spindles 20 and 36 have a pitch of 0.25 inch, and a groove 27 is provided only at one place in the axial direction, so that the change amount of a gap between the upper and lower rims when the spindle rotates one turn is 0.5 inch pitch (see FIG. 5).

BRIEF DESCRIPTION OF THE DRAWINGS

FIG. 5 is a longitudinal sectional side view showing a specific example of a tire uniformity machine in accordance with the present invention, the hatching being omitted;

DETAILED DESCRIPTION OF PREFERRED EMBODIMENTS

A tire uniformity machine in accordance with the present invention will be described below with reference to embodiments shown in FIGS. 1 to 4.

(First Embodiment)

Figure 1:
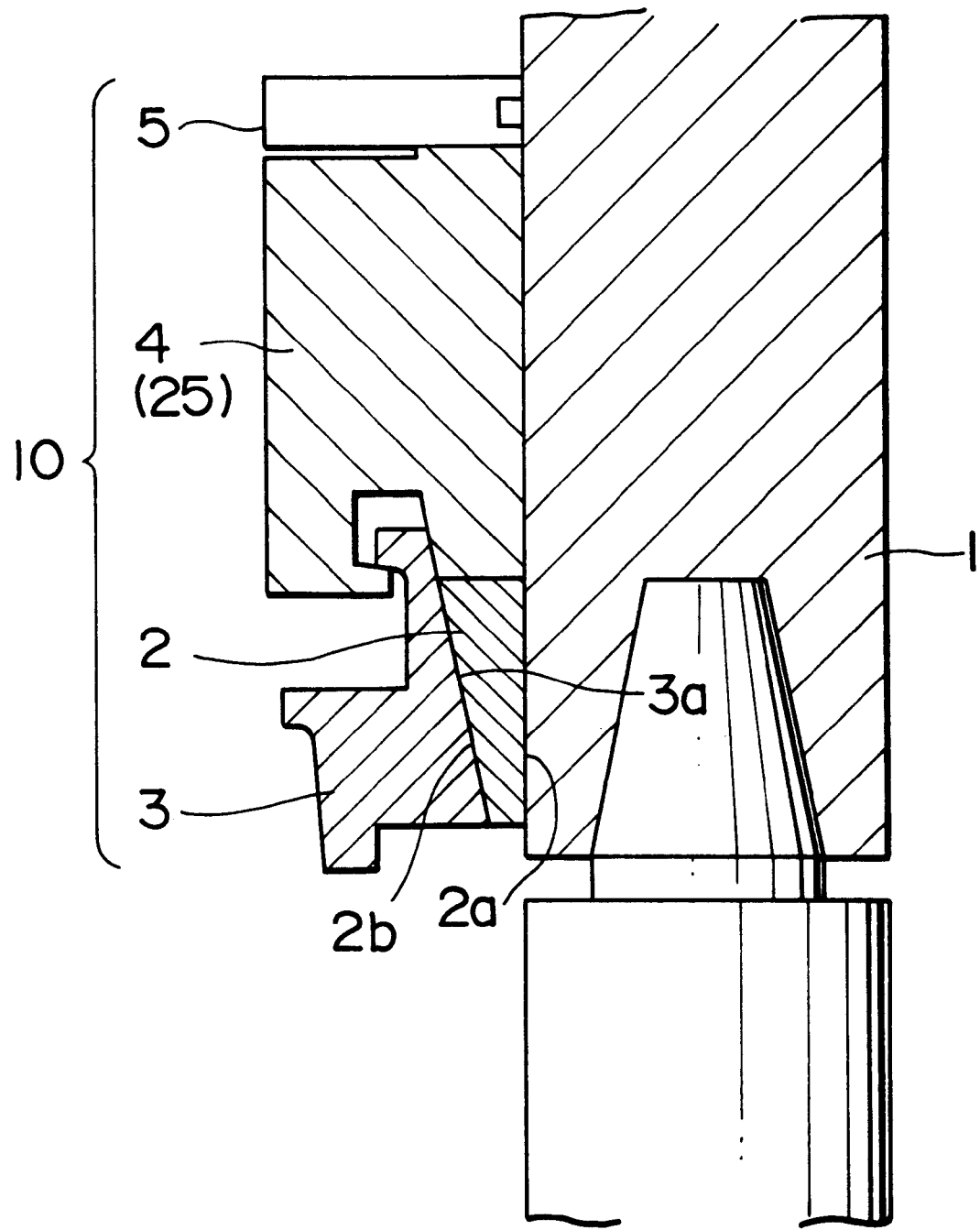
FIG. 1 is a longitudinal sectional side view schematically showing a first embodiment (claim 1) of a tire uniformity machine in accordance with the present invention.

On a tire uniformity machine shown in FIG. 1, a rim holding apparatus 10 is composed of a parallel spindle 1 which is in parallel with the axis of tire uniformity machine, a taper collet 2 formed with an inner hole 2a engaging concentrically with the parallel spindle 1 at the center portion thereof and a taper surface 2b at the outer peripheral portion thereof, a rim 3 formed with a taper surface 3a engaging with the taper surface 2b of the taper collet 2 at the inner peripheral portion thereof, a rim clamping device 4 which holds the rim 3 and is mounted so that the parallel spindle 1 is capable of being moved in the axial direction (for more details, refer to a rim clamping device 25 in FIGS. 2 and 5, described later), and a fixing device 5 for determining the axial position of the rim clamping device 4.

With the rim holding apparatus 10 of this tire uniformity machine, the inner hole 2a formed at the center portion of the taper collet 2 engages with the parallel spindle 1, and the taper surface 2b formed at the outer peripheral portion of the taper collet 2 engages with the taper surface 3b formed at the inner peripheral portion of the rim 3, as described above, so that the following operations are effected.

(1) When the rim 3 is fitted or removed, a gap between the upper opening of the rim 3 and the lower part of the taper collet 2 is widened.

(2) When the rim 3 is fitted, highly accurate concentricity of the rim 3 can be obtained by the taper collet 2.

(3) Even if a radial or axial load is applied to the rim holding apparatus 10, an aligning property can be secured with high accuracy (high rigidity can be obtained).

(4) When a tire is installed to the rim 3 and inflated, the rim 3 is pressed against the rim clamping device 4 by a tire inflate force.

(5) When the taper fit between the rim 3 and the taper collet 2 is loosened by using the rim clamping device 4, the rim 3 can be moved in the axial direction while being held.

(Second Embodiment)

Figure 2:
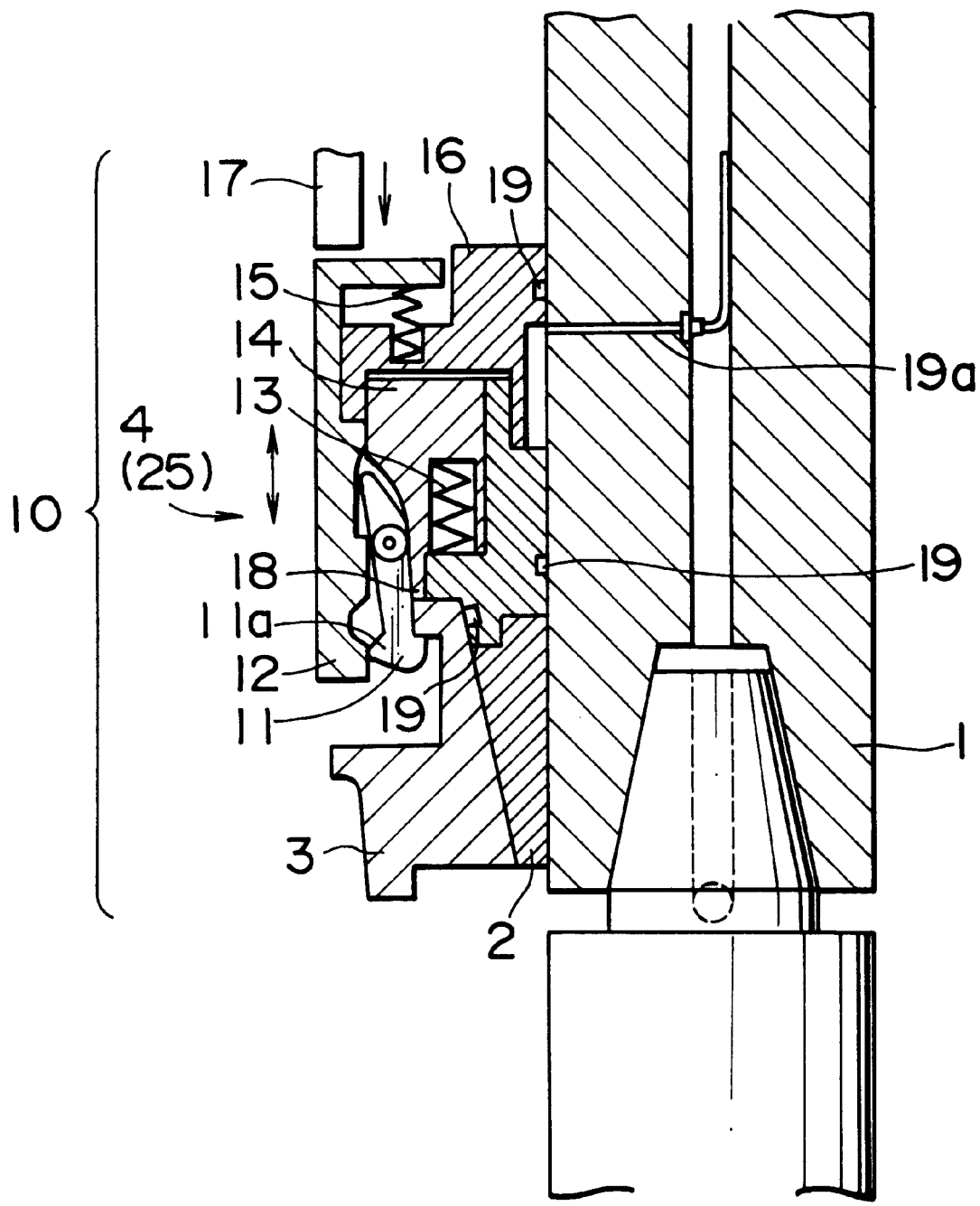
FIG. 2 is a longitudinal sectional side view schematically showing a second embodiment (claim 2) of a tire uniformity machine in accordance with the present invention.

On a tire uniformity machine shown in FIG. 2, a rim clamping device 4 (for more details, refer to a rim clamping device 25 in FIG. 5, described later) is composed of a hook 11 for holding/releasing a rim 3 by being opened/closed in the radial direction, a cylinder 12 for opening/closing the hook 11 by moving in the axial direction, a piston 14 which supports the hook 11 in such a manner as to be movable vertically and pushes the rim 3 by means of a pushing portion 18, a spring 13 for urging the piston 14 in the ascending direction, a spring 15 for urging the cylinder 12 in the ascending direction, a clamp body 16 which holds the rim 3, supports the piston 14 in such a manner as to be movable vertically, and is mounted so that a parallel spindle 1 is capable of being moved in the axial direction, and a pushing device 17 for pushing the cylinder 12 from the outside in the descending direction. Reference numeral 19 denotes an O-ring, and 19*a* denotes an air flow passage.

On this tire uniformity machine, since the rim clamping device 4 is configured as described above, the following operations are effected.

(1) When the cylinder 12 is pushed by means of the pushing device 17 with the piston 14 of a short stroke being moved to the rim 3 side, the hook 11 is opened. In this state, the rim 3 is pressed on the clamp body 16 side. Subsequently, by releasing the pushing device 17 from the cylinder 12, the restoring force of the spring 15 acts in the direction opposite to the rim 3 side, so that the cylinder 12 returns in the axial direction. Thereupon, the hook 11 is hooked to the flange portion of the rim 3, the rim 3 is pulled, and the rim 3 and the taper collet 2 are taper fitted to each other, so that the rim 3 is locked securely.

(2) When the piston 14 of a short stroke is pushed toward the rim 3 with the rim 3 being locked, the hook 11 is pushed out slightly, and a push portion 18 of the piston 14 pushes the rim 3, so that the taper fit between the rim 3 and the taper collet 2 is loosened with the rim 3 being held.

(3) When the cylinder 12 is pushed by the pushing device 17 in the state of the above item (2), the rim 3 is released.

(4) Since the rim 3 is locked by the restoring forces of the springs 13 and 15, the cylinder will not move even if the air is relieved. Therefore, the hook 11 is not opened, and the hook 11 does not come off from the rim 3.

(Third Embodiment)

On a tire uniformity machine shown in FIG. 3, a rim width changing apparatus 35 between upper and lower rims is composed of threads 21 provided on an upper spindle 20 having a driving unit, a parallel spindle portion 22 provided on the upper spindle 20 below the threads 21, a moving device 23 mounted so as to enable the rotation and axial movement of the upper spindle 20 via the threads 21 of the upper spindle 20, a detent pin 24 for inhibiting the relative rotation between the upper spindle 20 and the moving device 23, a rim clamping device 25 which engages with the parallel spindle portion 22 of the upper spindle 20 and is rotatably connected to the moving device 23 (for more details, refer to a rim clamping device 25 in FIG. 5, described later), a rim 3, a detent key 26 for inhibiting the relative rotation between the rim clamping device 25 and the spindle 20, a groove 27 for supporting the detent pin 24 of the moving device 23 in such a manner as to be movable along the upper spindle 20, and an arm 28 for pulling out the detent pin 24 of the moving device 23.

Figure 3:
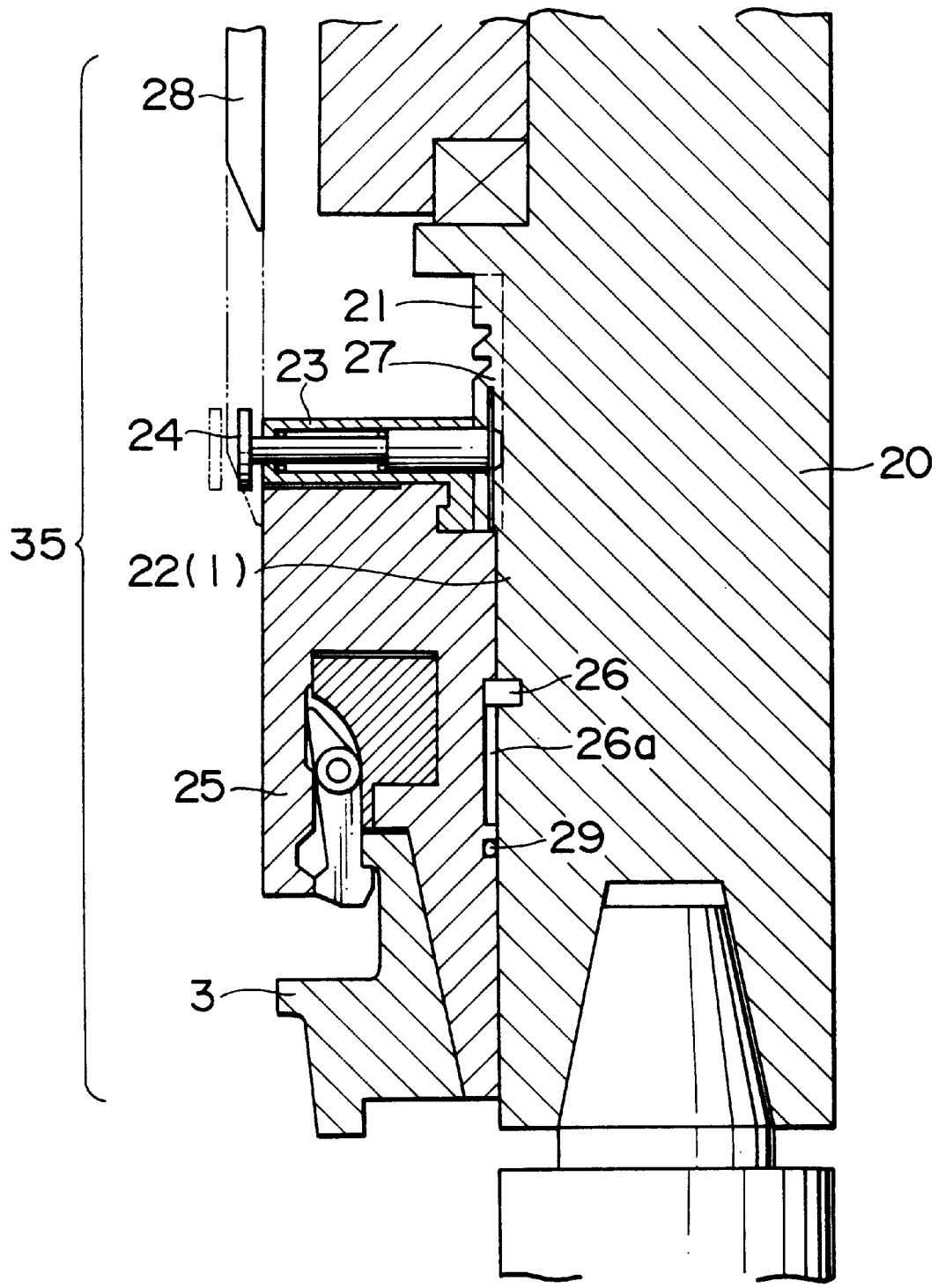
FIG. 3 is a longitudinal sectional side view schematically showing a third embodiment (claim 3) of a tire uniformity machine in accordance with the present invention.

Reference numeral 29 as shown in FIG. 3 is an O-ring.

On this tire uniformity machine, since the rim width changing apparatus 35 between upper and lower rims is configured as described above, the following operations are effected.

(1) With the rim 3 being held by the rim clamping device 25, the detent pin 24 of the moving device 23 is pulled out of the groove 27, the arm 28 is inserted in the detent pin 24, the detent pin 24 is fixed at the pull-out position, and then the spindle 20 is rotated. Thus, the rim 3 is moved in the axial direction by the threads 21 (for example, right-hand threads) and the moving device 23.

(2) In the state of the above item (1), the relative rotation between the rim clamping device 25 and the spindle 20 does not occur due to the detent key 26 and a key groove 26*a,* and the rim clamping device 25 moves in the axial direction.

(Fourth Embodiment)

Figure 4:
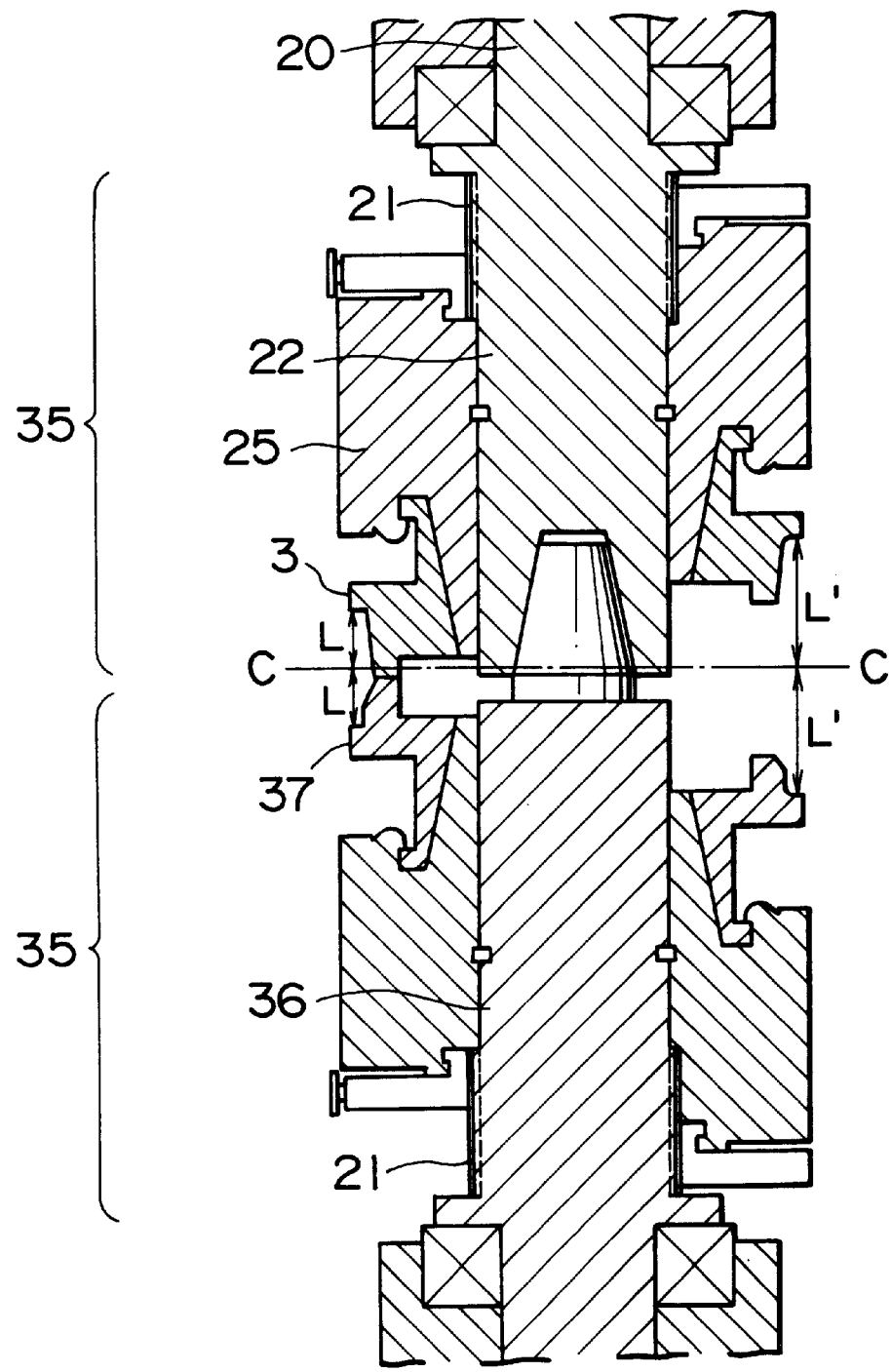
FIG. 4 is a longitudinal sectional side view schematically showing a fourth embodiment (claims 4 and 5) of a tire uniformity machine in accordance with the present invention.

On a tire uniformity machine shown in FIG. 4, rim width changing apparatuses 35 between upper and lower rims are installed symmetrically to the upper and lower spindles 20 and 36, threads 21 on the upper spindle 20 and threads 21 on the lower spindle 36 are formed in the direction opposite to each other, and the upper and lower spindles 20 and 36 are rotated at the same time while being chucked, by which the rim widths between upper and lower rims are changed vertically by the same amount, so that the rim width between upper and lower rims is changed while the centerline (indicated by C—C line) between the upper and lower rims 3 and 37 is kept constant.

On this tire uniformity machine, since the rim width changing apparatus 35 between upper and lower rims is configured as described above, the following operations are effected.

(1) Since the rim width changing apparatus 35 between upper and lower rims is mounted symmetrically to the lower spindle 36 as is mounted to the upper spindle 20, and the threads 21 of the upper spindle 20 is right-hand threads whereas the threads 21 of the lower spindle 36 are left-hand threads, the upper and lower rims are moved with respect to the centerline at the same time by the same amount when the upper spindle 20 and the lower spindle 36 are rotated while being chucked (see L and L'). Therefore, the centerline of tire is unchanged, the offset being zero, and the rim width between upper and lower rims is changed rapidly.

(2) When the upper rim 3 is unlocked with the gap between the upper and lower rims at a minimum, the upper rim 3 is lapped over the rim 37.

(Fifth Embodiment)

On a tire uniformity machine shown in FIG. 4, the threads 21 formed on the upper and lower spindles 20 and 36 have a pitch of 0.25 inch, and a groove 27 is provided only at one place in the axial direction, so that the change amount of a gap between the upper and lower rims when the spindle rotates one turn is 0.5 inch pitch.

On this tire uniformity machine, since the threads 21 formed on the upper and lower spindles 20 and 36 have a pitch of 0.25 inch, and a groove 27 is provided only at one place in the axial direction, the change amount of a gap between the upper and lower rims when the spindle rotates one turn is 0.5 inch pitch.

By making the thread pitch 0.25 inch in this manner, the change amount of rim gap due to one turn of upper and lower spindles can be changed into 0.5 inch pitch, which is the difference of tire set rim gap due to the difference of ordinary tire size. Also, two grooves 27 spaced 180-degree apart can cope with 0.25 inch pitch.

The tire uniformity machine in accordance with the present invention has been described with reference to the embodiments shown in FIGS. 1 to 4. Next, the rim clamping device 25 and the rim width changing apparatus 35 between upper and lower rims will be described in more detail with reference to FIG. 5.

As shown in FIGS. 2 and 5, the rim clamping device 25 is composed of the hook 11 which opens/closes in the radial direction to hold/release the rim 3, the cylinder 12 which moves in the axial direction to open/close the hook 11, the piston 14 which supports the hook 11 in such a manner as to be movable vertically and pushes the rim 3 by means of the push portion 18 when lowering, the spring 13 for urging the piston 14 in the ascending direction, the spring 15 for urging the cylinder 12 in the ascending direction, the clamp body 16 which holds the rim 3, supports the piston 14 in such a manner as to be movable vertically, and is mounted so that a parallel spindle 1 is capable of being moved in the axial direction, and the pushing device 17 for pushing the cylinder 12 from the outside in the descending direction. Therefore, (1) When the cylinder 12 is raised, the hook 11 closes in the radial direction due to the shape of an inside 42 of the cylinder 12, and the rim 3 is clamped. When the piston 14 is raised, the hook 11, which is supported by the piston 14, is also raised, and the rim 3 is locked. The hook of the rim 3 is denoted by the reference numeral 40. By the reverse operation, the rim 3 is unlocked.

(2) When the piston 14 is pushed down with the rim locked, the hook 11 slides on the parallel portion of the inside 42 of the cylinder 12, going down vertically, so that the taper fit is loosened, the rim 3 becoming in the hold state.

Figure 6A:
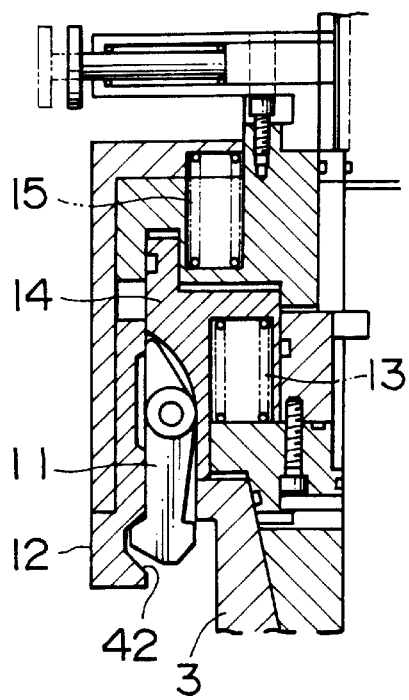
FIGS. 6(a) to 6(c) are views for illustrating the operation of a tire uniformity machine in accordance with the present invention.
Figure 6B:
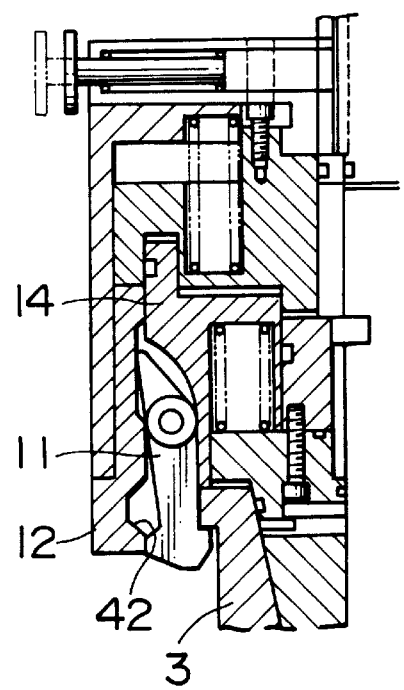
Figure 6C:
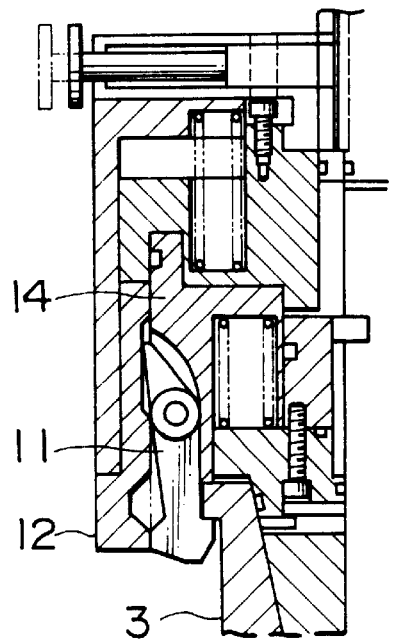

FIGS. 6(a), 6(b), and 6(c) show the states of rim unlock (a), rim hold (b), and rim lock (c), respectively.

Since the rim 3 is locked only by the restoring forces of the springs 13 and 15, the hook 11 does not come off from the hook 11 and drop even if the air in the piston 14 is relieved. However, the pushing force of the pushing device 17, which pushes the cylinder 12, against the cylinder 12 when the air is relieved, must be low enough not to affect the restoring force of the spring 15.

As shown in FIG. 5, the rim width changing apparatus 35 between upper and lower rims is composed of the threads 21 provided on the upper spindle 20 having a driving unit, the parallel spindle portion 22 provided on the upper spindle 20 below the threads 21, the moving device 23 mounted so as to enable the rotation and axial movement of the upper spindle 20 via the threads 21 of the upper spindle 20, the detent pin 24 for inhibiting the relative rotation between the upper spindle 20 and the moving device 23, the rim clamping device 25 which engages with the parallel spindle portion 22 of the upper spindle 20 and is rotatably connected to the moving device 23, the rim 3, the detent key 26 for inhibiting the relative rotation between the rim clamping device 25 and the spindle 20, the groove 27 for supporting the detent pin 24 of the moving device 23 in such a manner as to be movable along the upper spindle 20, and the arm 28 for pulling out the detent pin 24 of the moving device 23.

The rim width changing apparatuses 35 between upper and lower rims are installed symmetrically to the upper and lower spindles 20 and 36, the threads 21 on the upper spindle 20 and threads 21 on the lower spindle 36 are formed in the direction opposite to each other, and the upper and lower spindles 20 and 36 are rotated at the same time while being chucked, by which the rim widths between upper and lower rims are changed vertically by the same amount, so that the rim width between upper and lower rims is changed while the centerline between the upper and lower rims 3 and 37 is kept constant. Therefore, (1) With the rim 3 being held by the rim clamping device 25, the detent pin 24 of the moving device 23 is pulled out of the groove 27, the arm 28 is inserted in the detent pin 24, the detent pin 24 is fixed at the pull-out position, and then the spindle 20 is rotated. Thus, the rim 3 is moved to any position in the axial direction by the threads 21 (for example, right-hand threads) and the moving device 23, so that the positioning at any position can be done without the external loader unit.

(2) In the state of the above item (1), the relative rotation between the rim clamping device 25 and the spindle 20 does not occur due to the detent key 26, so that an inner pressure seal such as an o-ring 41 interposed between the rim clamping device 25 and the spindle 20 is not twisted. Therefore, the breakage of or air leakage from the inner pressure seal such as the O-ring 41 is less prone to occur.

Figure 7:
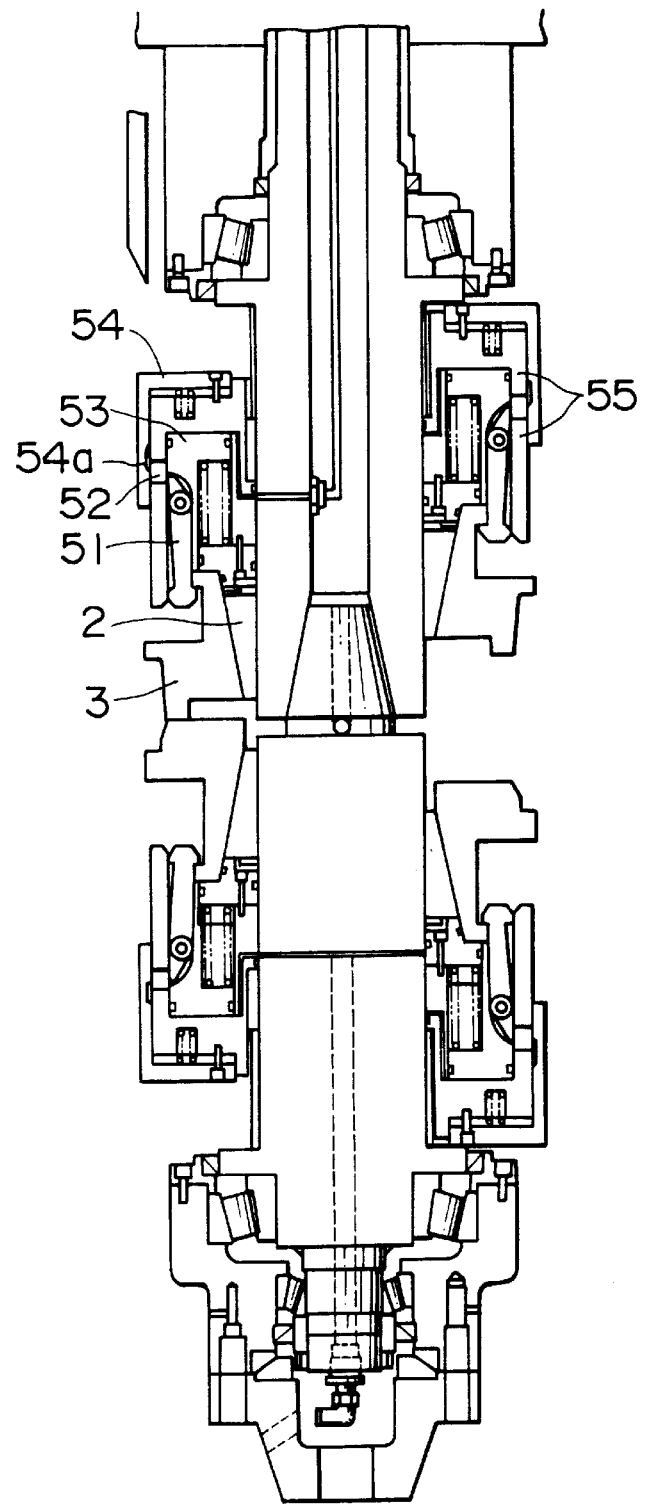
FIG. 7 is a longitudinal sectional side view showing another specific example of a tire uniformity machine in accordance with the present invention, the hatching being omitted.

FIG. 7 shows a tire uniformity machine in which a hook 51 having a shape different from that of the hook 11 shown in FIG. 5 is used, a cylinder 54 having a shape different from that of the cylinder 12 shown in FIG. 5 is used, and a ball 52 is fitted in a clamp body 55.

On this tire uniformity machine, a piston 53 is first pushed down until it hits the ball 52. Thereby, the taper fit between the rim 3 and the taper collet 2 is loosened, the rim 3 becoming in the hold state.

Then, the cylinder 54 is pushed down. Thereby, the ball 52 enters the cylinder 54a, the piston 53 is further pushed in, and the hook 51 comes off from the rim 3, the rim becoming in the unlock state.

By performing the reverse operation, the rim 3 becomes in the lock state.

The ball 52 for stopping the piston 53 with a short stroke may be so configured as to be pulled in and out in place of the pin. Other mechanisms are basically the same as those of the tire uniformity machine shown in FIG. 5.

Figure 8:
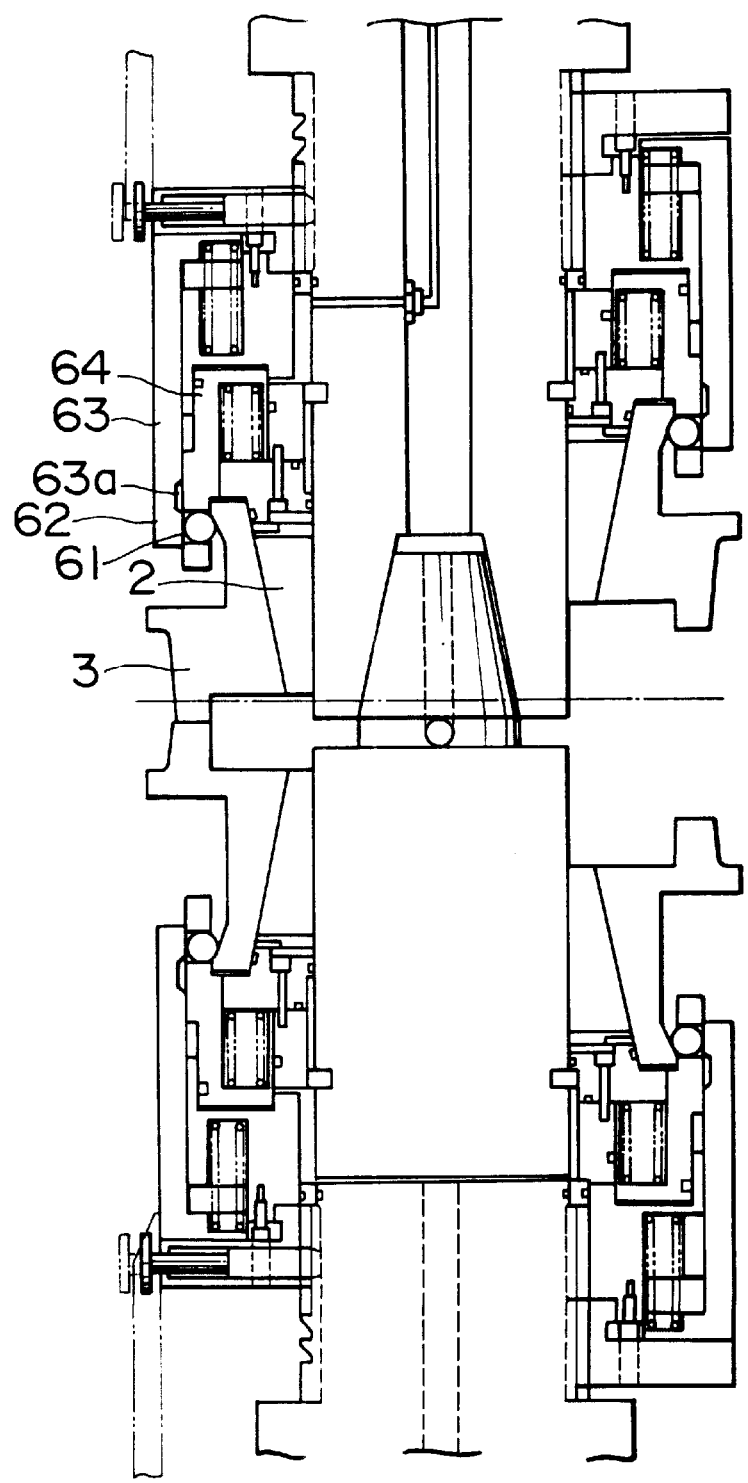
FIG. 8 is a longitudinal sectional side view showing still another specific example of a tire uniformity machine in accordance with the present invention, the hatching being omitted.

FIG. 8 shows a tire uniformity machine in which a ball 61 having a shape and construction different from those of the hook 11 shown in FIG. 5 is used, and a cylinder 63 having a shape different from that of the cylinder 12 shown in FIG. 5 is used.

On this tire uniformity machine, a piston 64 is first pushed down with a short stroke. Thereby, the ball 61 goes down along the parallel portion 62 on the inside of cylinder, whereby the taper fit between the rim 3 and the taper collet 2 is loosened, the rim becoming in the hold state.

Then, the cylinder 63 is pushed down. Thereby, the ball 61 enters a concave 63a, the rim 3 becoming in the unlock state. By performing the reverse operation, the rim 3 becomes in the lock state. Other mechanisms are basically the same as those of the tire uniformity machine shown in FIG. 5.

Figures 9A, 9B:
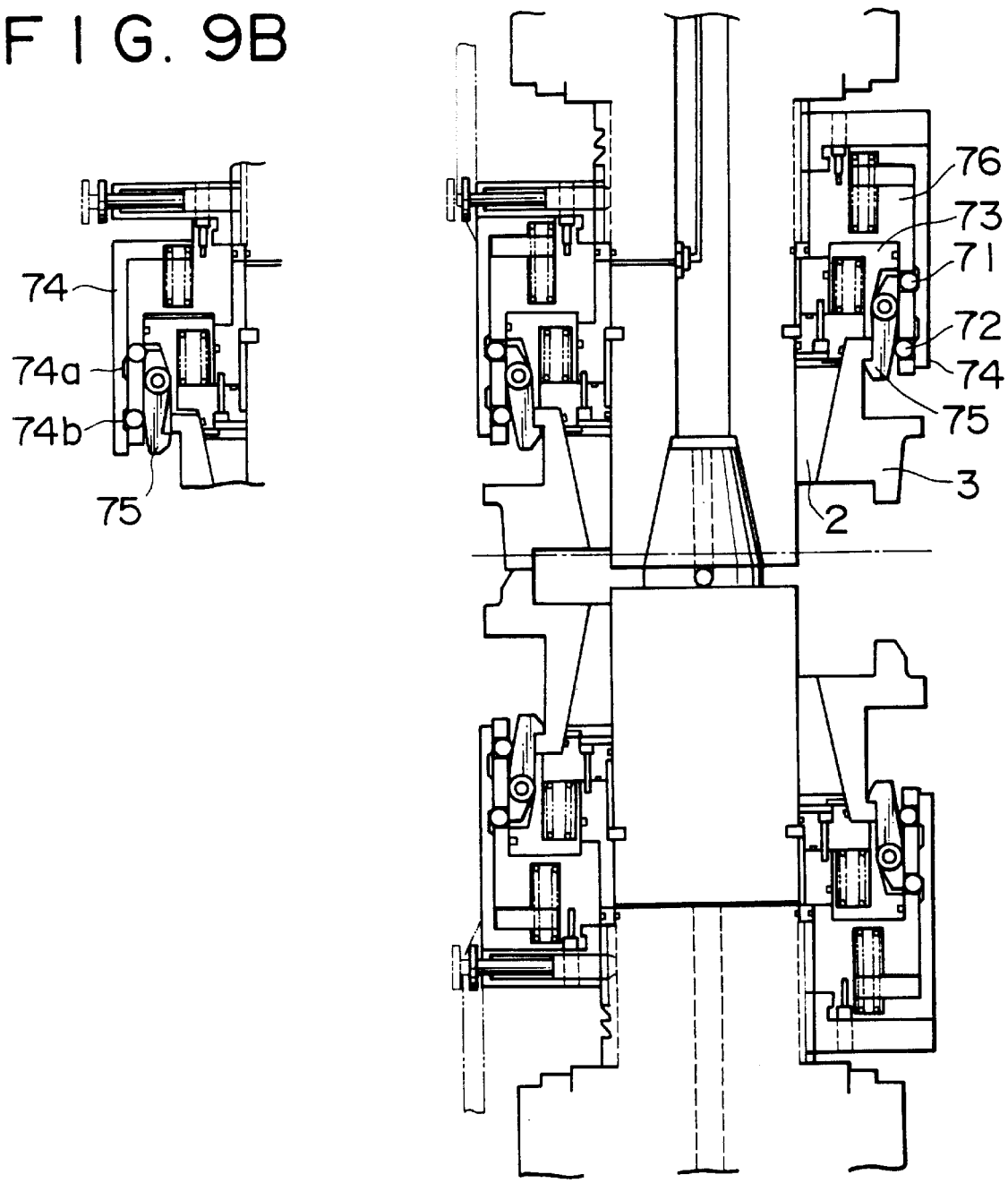
FIG. 9 is a longitudinal sectional side view showing still another specific example of a tire uniformity machine in accordance with the present invention, the hatching being omitted.
Figure 10:
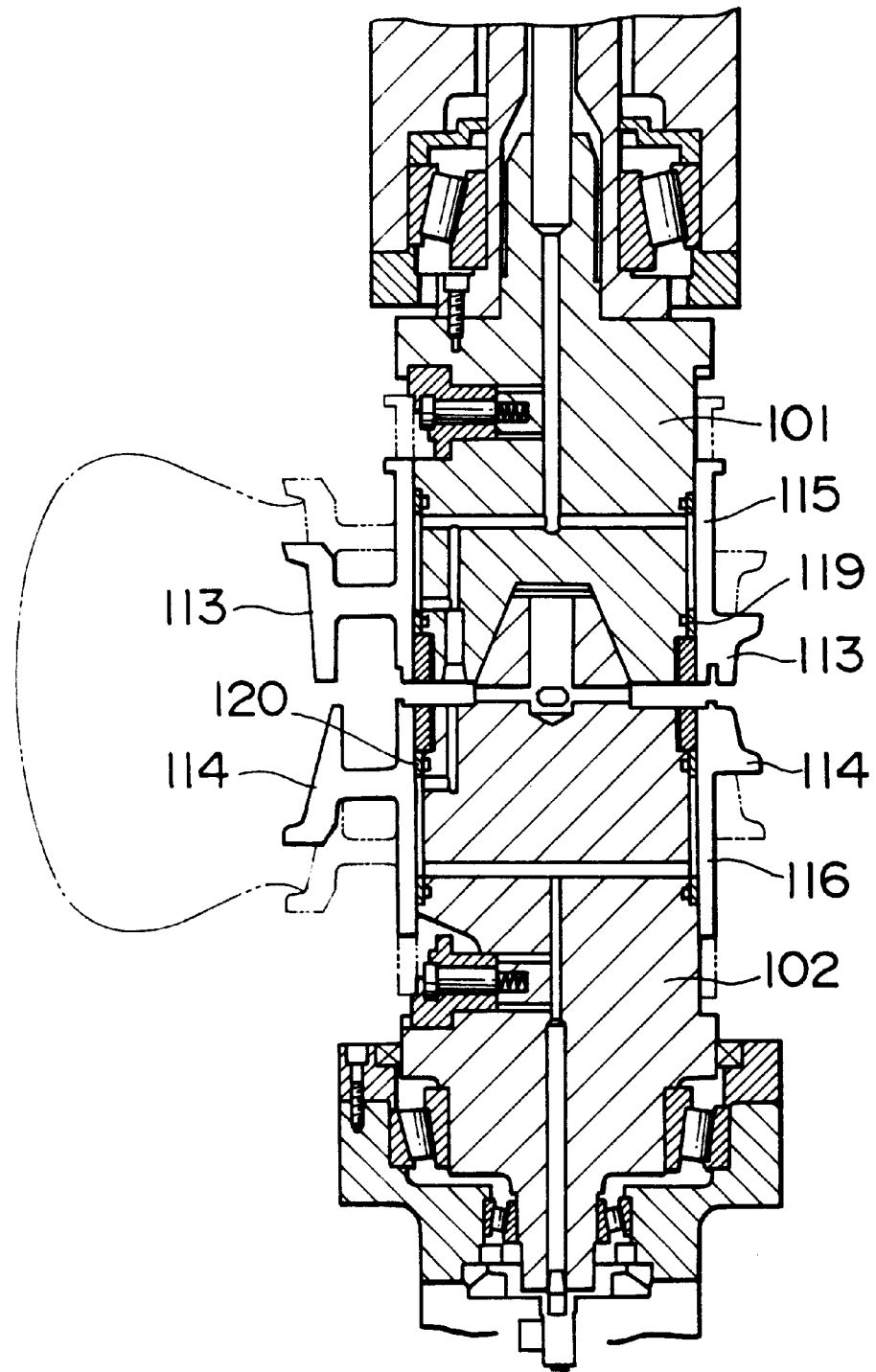
FIG. 10 is a longitudinal sectional side view showing one example of a conventional tire uniformity machine.
Figure 11:
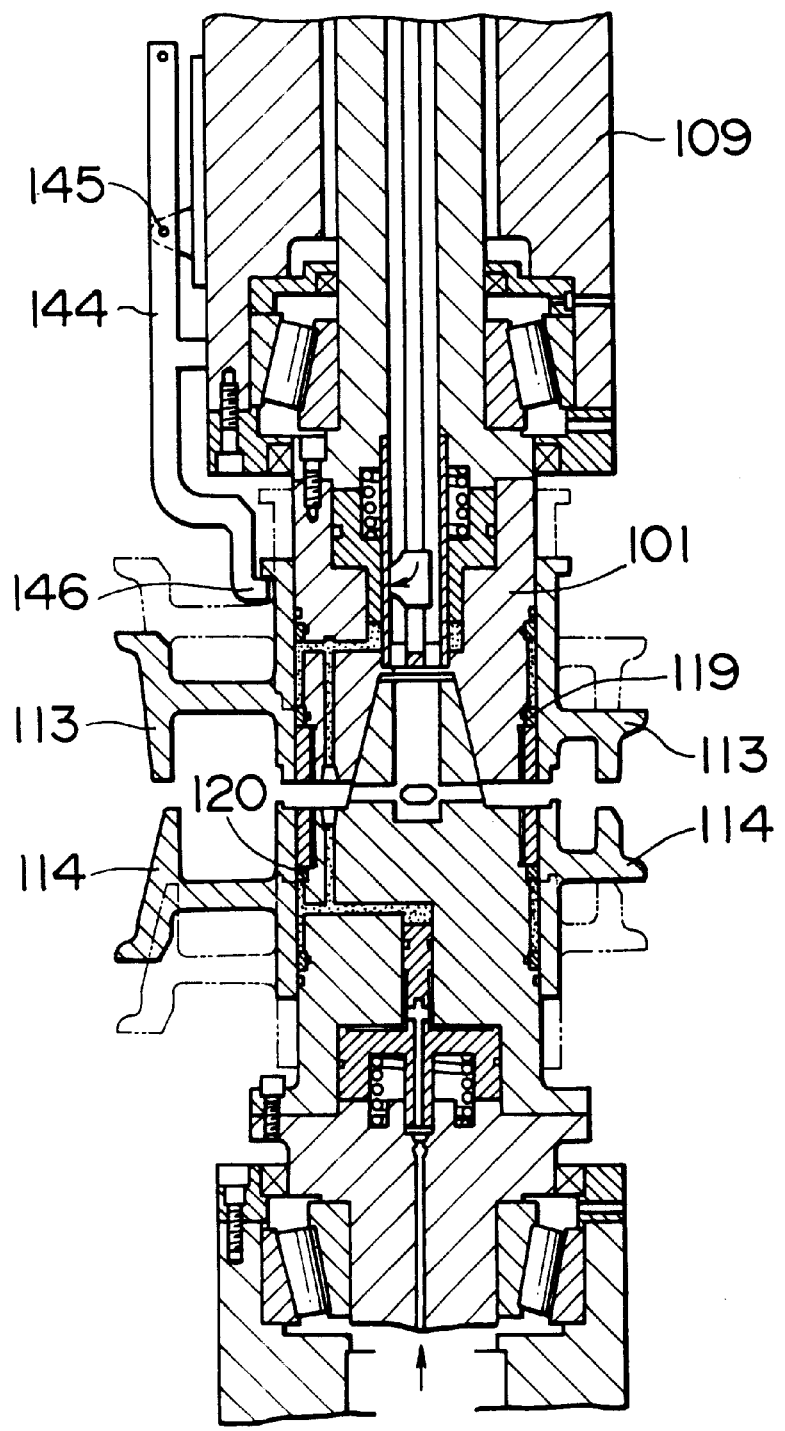
FIG. 11 is a longitudinal sectional side view showing another example of a conventional tire uniformity machine.
Figure 12:
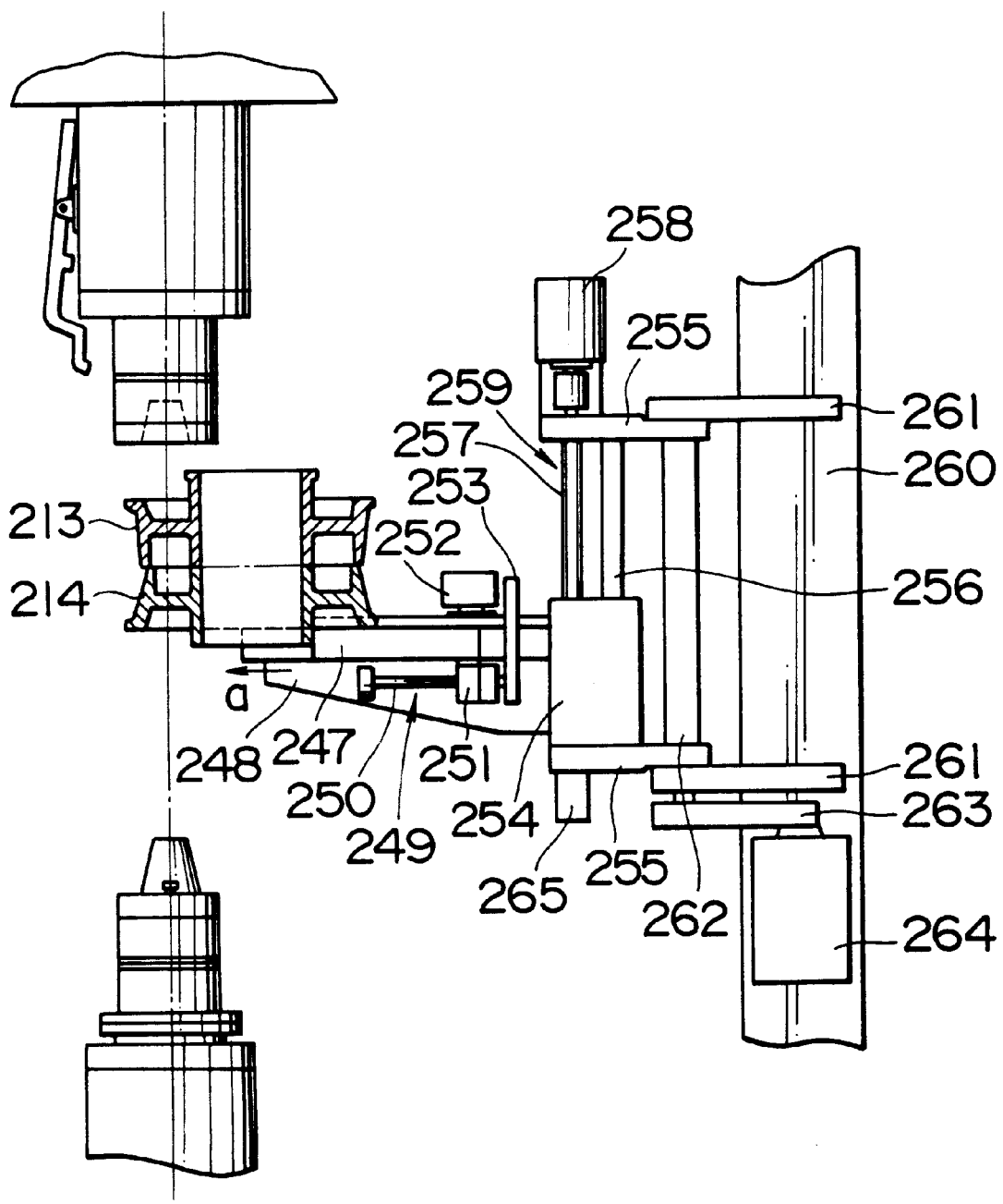
FIG. 12 is a longitudinal sectional side view showing still another example of a conventional tire uniformity machine.
Figure 13:
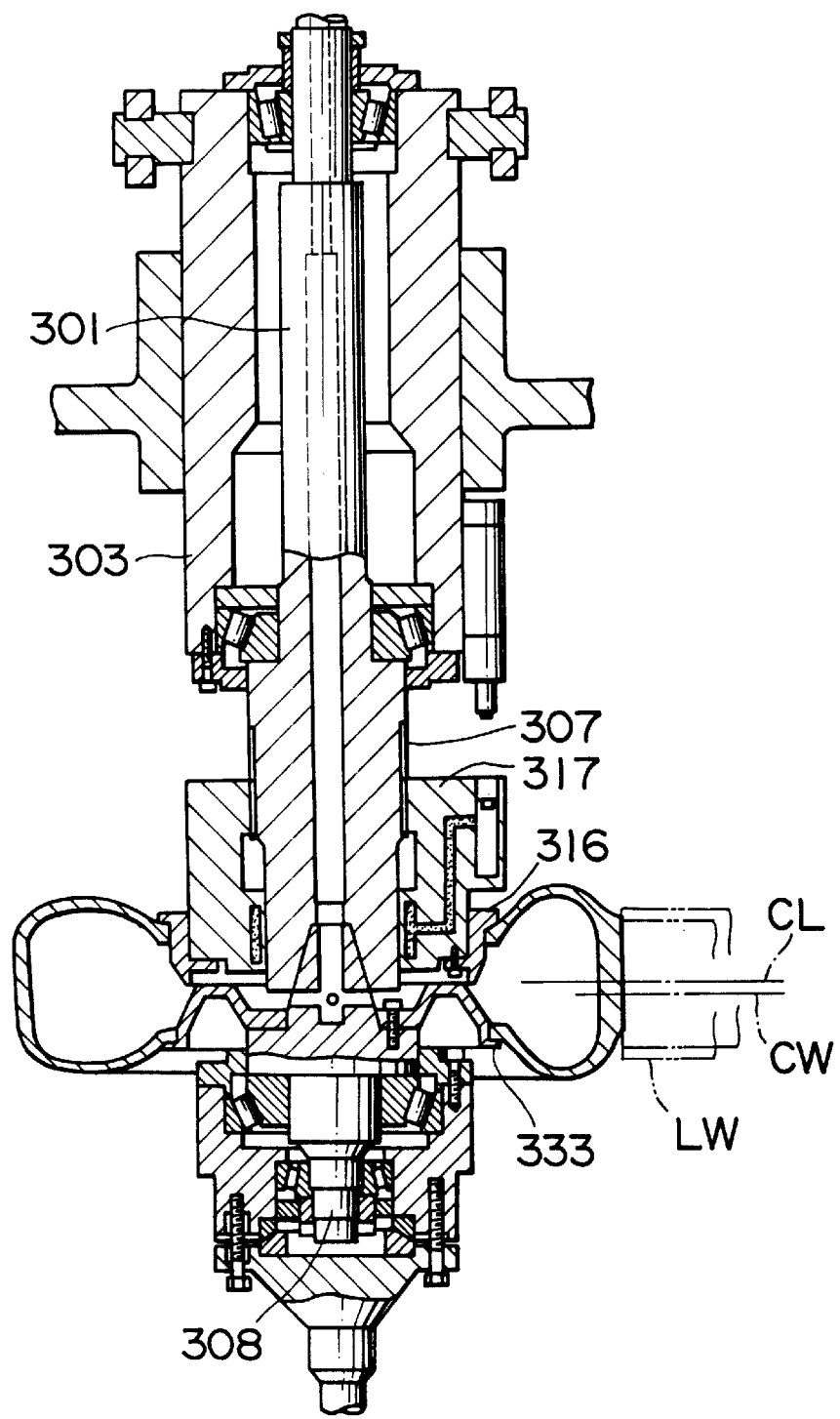
FIG. 13 is a longitudinal sectional side view showing still another example of a conventional tire uniformity machine.

FIG. 9 shows a tire uniformity machine in which a hook 75 having a shape different from that of the hook 11 shown in FIG. 5 is used, a cylinder 74 having a shape different from that of the cylinder 12 shown in FIG. 5 is used, and balls 71 and 72 are fitted in a clamp body 76.

On this tire uniformity machine, a piston 73 is first pushed down with a short stroke. Thereby, the upper and lower two balls 71 and 72 go down along the parallel portion on the inside of the cylinder 74, whereby the taper fit between the rim 3 and the taper collet 2 is loosened, the rim becoming in the hold state (see FIG. 9(a)).

Then, the cylinder 74 is pushed down. Thereby, the lower ball 72 enters a concave 74a, whereas the upper ball 71 leaves a concave 74a and enters the inside, and the hook 75 comes off from the rim 3, the rim 3 becoming in the unlock state. By performing the reverse operation, the rim 3 becomes in the lock state (see FIG. 9(b)). Other mechanisms are basically the same as those of the tire uniformity machine shown in FIG. 5.

The tire uniformity machine defined in claim 1 achieves the following effects:
(1) Since the inner hole formed at the center portion of the taper collet 2 engages with the parallel spindle 1 and the taper surface formed at the outer peripheral portion of the taper collet 2 engages with the taper surface formed at the inner peripheral portion of the rim 3, the gap between the rim 3 and the taper collet 2 is widened when the rim 3 is fitted or removed, so that a high positioning accuracy is not required in terms of the concentricity and parallelism between the rim 3 and the spindle 1, and the conveying and axial guiding of the rim 3 can be performed easily.
(2) Since the rim 3 and the taper collet 2 are taper fitted to each other, the accuracy of aligning property when the rim 3 is locked can be improved and misalignment can be prevented. Moreover, even if a radial or axial load is applied to the rim holding apparatus 10, the accuracy of aligning property can be secured.
(3) By mounting a tire to the rim 3 and inflating it, an inflate inner pressure can be applied in the axial direction of the rim 3. At this time, since the rim 3 and the taper collet 2 are taper fitted to each other, the pressing force of the rim 3 against the taper collet 2 can be increased, resulting in further improved concentricity and holding force of the rim 3.

The tire uniformity machine defined in claim 2 achieves the following effects:
(1) The rim 3 is pressed on the clamp body 16 side, the restoring force of the spring 15 acts in the direction opposite to the rim 3 side by releasing the pushing device 17 from the cylinder 12, so that the cylinder 12 returns in the axial direction. Thereupon, the hook 11 is hooked to the flange portion of the rim 3, the rim 3 is pulled, and the rim 3 and the taper collet 2 are taper fitted to each other. Therefore, the rim 3 can be locked securely.
(2) When the piston 14 of a short stroke is pushed toward the rim 3 with the rim 3 being locked, the hook 11 is pushed out slightly, and the push portion 18 of the piston 14 pushes the rim 3, so that the taper fit between the rim 3 and the taper collet 2 is loosened. Therefore, the rim holding apparatus 10 can be moved in the axial direction with the rim 3 being held.
(3) When the cylinder 12 is pushed by the pushing device 17 in the hold state of the rim 3 in the above item (2), the rim 3 is unlocked. Therefore, the replacement and movement of the rim 3 can be performed easily.
(4) Since the rim 3 is locked by the restoring forces of the springs 13 and 15, the cylinder will not move even if the air is relieved. Therefore, the hook 11 is not opened, and the hook 11 does not come off from the rim 3, ensuring safety.
(5) The rim clamping device 25 has not only a rim fitting/removing function but also a rim drop preventive function. Therefore, the addition of an external drop preventive mechanism is not needed, so that the tire uniformity machine can be made small-sized.
(6) Since three operations of lock, unlock, and hold of the rim 3 are performed by air operation of one flow passage from the inside of the piston 14 and mechanical operation, the construction of the inside of the spindle 20 can be simplified.

The tire uniformity machine defined in claim 3 achieves the following effects:
(1) With the rim 3 being held by the rim clamping device 25, the detent pin 24 of the moving device 23 is pulled out of the groove 27, the arm 28 is inserted in the detent pin 24, and the detent pin 24 is fixed. When the spindle 20 is rotated, the rim 3 is moved in the axial direction by the threads 21 (for example, right-hand threads) and the moving device 23. Therefore, an external loader unit is unnecessary.
(2) When the rim width is changed, even if the spindle 20 is rotated, the relative rotation between the rim clamping device 25 and the spindle 20 does not occur due to the detent key 26, and the rim clamping device 25 moves in the axial direction. Therefore, when the rim width is changed, early damage to the inner pressure seal for the rim can be prevented.

The tire uniformity machine defined in claim 4 achieves the following effects:
(1) Since the rim width changing apparatus 35 between upper and lower rims is mounted symmetrically to the lower spindle 36 as is mounted to the upper spindle 20, and the threads 21 of the lower spindle 36 are inverse threads (left-hand threads), the upper and lower rims are moved symmetrically with respect to the centerline of tire at the same time by the same amount when the upper spindle 20 and the lower spindle 36 are rotated while being chucked, so that the rim width can be changed rapidly, and the tire centerline is unchanged when the rim width is changed. Therefore, there is no offset between the tire centerline and load wheel centerline, which eliminates an influence of offset on LFD, conicity, etc.
(2) By unlocking the upper rim 3 with the gap between the upper and lower rims at a minimum, the upper rim 3 can be lapped over the rim 37. Therefore, the upper and lower rims can be removed at one time by a loader merely by holding the lower rim. Inversely, merely by setting the upper and lower rims on the lower spindle 36, the upper rim can be locked by being pulled up by means of the upper hook 11 of the rim width changing apparatus 35 with the upper and lower rim widths at a minimum. Therefore, it is unnecessary to set the upper and lower rims separately.

The tire uniformity machine defined in claim 5 achieves the following effect:
The threads 21 formed on the upper and lower spindles 20 and 36 have a pitch of 0.25 inch, and the groove 27 is provided only at one place in the axial direction. By using the driving unit and upper and lower rim width changing apparatus for the conventional uniformity machine, the change amount of a gap between the upper and lower rims when the spindle rotates one turn can be made 0.5 inch pitch, which is required by the uniformity machine.

What is claimed is:
1. A tire uniformity machine in which a tire is mounted between upper and lower spindles via upper and lower rims, said tire uniformity machine being characterized in that a rim width changing apparatus 35 between upper and lower rims comprises threads 21 provided on an upper spindle 20 having a driving unit, a parallel spindle portion 22 provided on the upper spindle 20 below the threads 21, a moving device 23 mounted so as to enable the rotation and axial movement of the upper spindle 20 via the threads 21 of the upper spindle 20, a detent pin 24 for inhibiting the relative rotation between the upper spindle 20 and the moving device 23, a rim clamping device 25 which engages with the parallel spindle portion 22 of the upper spindle 20 and is rotatably connected to the moving device 23, a rim 3, a detent key 26 for inhibiting the relative rotation between the rim clamping device 25 and the spindle 20, a groove 27 for supporting the detent pin 24 of the moving device 23 in such a manner as to be movable along the upper spindle 20, and an arm 28 for pulling out the detent pin 24 of the moving device 23.

2. A tire uniformity machine according to claim 1, wherein the rim width changing apparatus 35 between upper and lower rims are installed symmetrically to the upper and lower spindles 20 and 36, threads on the upper spindle 20 and threads on the lower spindle 36 are formed in the direction opposite to each other, and the upper and lower spindles 20 and 36 are rotated at the same time while being chucked, by which the vertical rim widths are changed by the same amount, so that the rim width between upper and lower rims is changed while the centerline between the upper and lower rims 3 and 37 is kept constant.

3. A tire uniformity machine according to claim 2, wherein the threads formed on the upper and lower spindles 20 and 36 have a pitch of 0.25 inch, and a groove 27 is provided only at one place in the axial direction, so that the change amount of a gap between the upper and lower rims when the spindle rotates one turn is 0.5 inch pitch.

* * * * *